Mar. 27, 1923.
B. BECKE
1,449,933
FRUIT CRUSHER
Filed Dec. 19, 1922
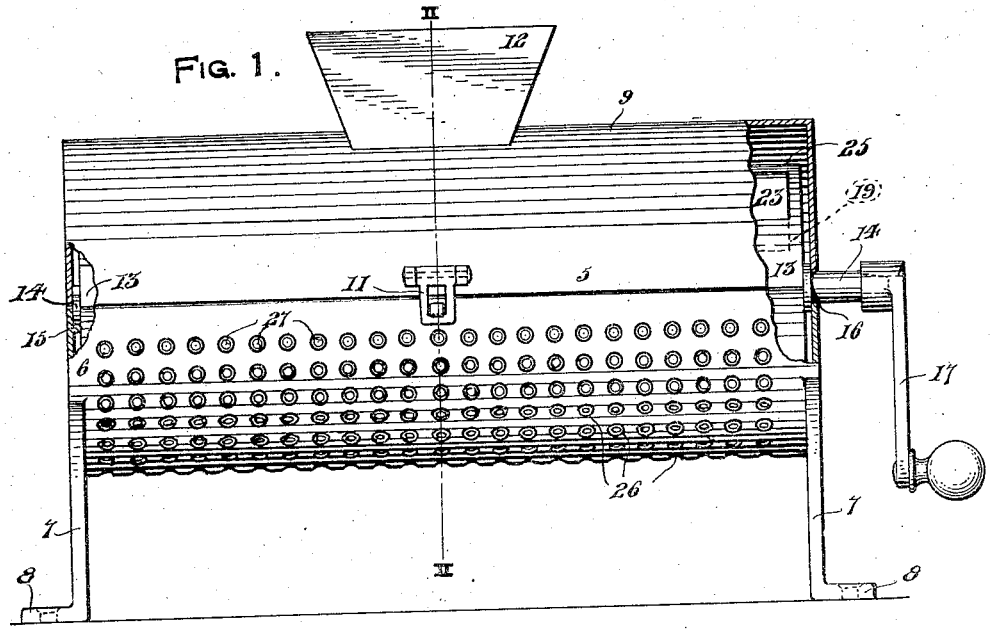
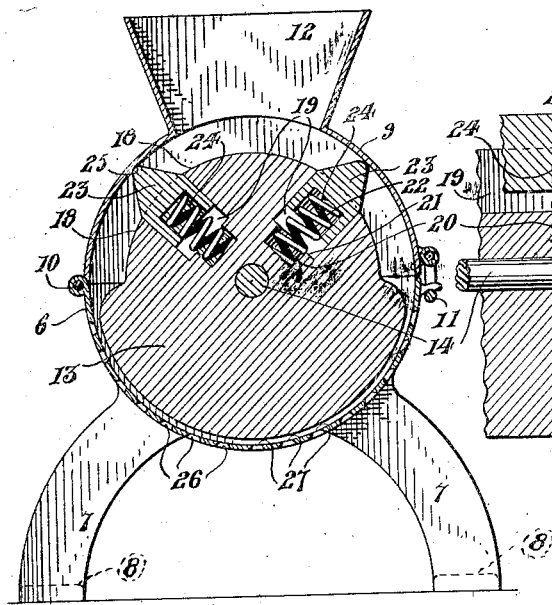
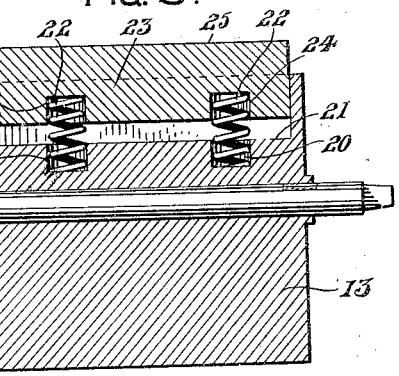
Inventor
*B. Becke*
By *F. L. Bryant*
Attorney Patented Mar. 27, 1923.

1,449,933

UNITED STATES PATENT OFFICE.

BÉLA BECKE, OF FARRELL, PENNSYLVANIA.

FRUIT CRUSHER.

Application filed December 19, 1922. Serial No. 607,797.

*To all whom it may concern:*

Be it known that I, BÉLA BECKE, a citizen of Hungary, residing at Farrell, in the county of Mercer and State of Pennsylvania, have invented certain new and useful Improvements in Fruit Crushers, of which the following is a specification.

This invention relates to certain new and useful improvements in fruit crushers or smashers, and has particular reference to that type of crusher best adapted for handling tomatoes.

An important object of the invention is to provide a device of the above mentioned type that is adapted for smashing tomatoes or the like, to prepare the same for cooking or preserving, the tomato pulp and seeds being cut into small pieces and delivered from the device with the juice.

A further object of the invention is to construct the device so that the delivery openings will not become clogged during the operation of the crusher and wherein the device may be easily taken apart to wash or clean the same.

Other objects and advantages of the invention will be apparent during the course of the following description.

In the accompanying drawing forming a part of this specification and in which like numerals are employed to designate like parts throughout the same, Figure 1 is a side elevational view, partly in section, of the device embodying my invention, Figure 2 is a vertical sectional view taken on line II—II of Fig. 1, and Figure 3 is a fragmentary sectional view of the rotary crushing member embodying my invention.

In the drawing, wherein for the purpose of illustration is shown a preferred embodiment of my invention, the numeral 5 designates a horizontally disposed cylinder or drum having a bottom portion 6 provided with spaced legs 7 carried at its opposite ends, the said legs being provided with apertured feet 8 which afford means for securing the device to a table, if so desired. The upper portion of the cylinder or drum 5, as designated by the numeral 9, is hinged to the lower portion as at 10 and provided with a clasp or catch 11 for retaining the same in its operative position. The top portion 9 is further provided with a hopper 12 through which the fruit is fed into the cylinder or drum.

The rotary crusher mounted within the cylinder or drum 5 consists of a solid roller 13 having a shaft 14 that is supported at one end by means of the semi-circular projection or bearing 15 carried by the lower portion 6 and extends at its opposite end to an opening 16 formed in both upper and lower portions, the said shaft is further provided with a crank handle 17 for rotating the roller 13. Substantially one-half of the periphery of the roller member is cutaway as at 18 to allow for admission of the fruit between the roller and the cylinder or drum 5, this cutaway portion is further provided with longitudinally extending recesses 19 having spaced annular recesses 20 provided in their bottom walls 21 for receiving the inner ends of the spiral springs 22. Resiliently mounted within the longitudinal recesses 19 are longitudinally extending scrapers or bars 23 which are provided with spaced annular recesses 24 for receiving the outer ends of the spiral springs 22 as shown. The side walls of the scraper bars converge to form rounded edges 25 that are adapted to scrape against the inner periphery of the cylinder or drum 5.

The lower portion 6 of the cylinder or drum is provided with spaced inwardly tapering openings 26 which are provided with knife blade inner circular edges 27 which aid in cutting the fruit as it is forced through the openings. It will be apparent that the tapering walls of the openings 26 will prevent clogging as the small portions of fruit, having passed the reduced inner edges, will necessarily fall into the receptacle placed beneath the device.

The operation of the device is as follows:

The fruit to be crushed is fed through the hopper opening 12 to lodge within the cutaway portion 18, of the rotary cylinder or drum, when it passes beneath the hopper. The fruit is then carried to the lower portion of the cylinder where it is crushed by the solid portion of the roller and fed through the openings 26. The scraper bars 23, when passing over the said opening, will force the balance of the fruit from the cylinder and thereby clean or clear the openings. It is apparent that this operation will crush fruit placed within the device and force the same through the opening into a receptacle placed therebeneath.

It is to be understood that the form of my invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. In a device of the character described, a cylinder having tapered perforations, a hopper carried by said cylinder, a crushing roller rotatably mounted in said cylinder, resiliently supported scraper bars carried by said rollers, and means associated with the crusher roller for rotating the same within the cylinder.

2. In a device of the character described, a cylinder having tapered perforations formed in its lower portion, a hopper carried by the upper portion of said cylinder, a crushing roller journaled in said cylinder, the said roller having a portion of its periphery cutaway, scraper bars associated with said cutaway portion, and means associated with said roller for rotating the same within the cylinder.

3. In a device of the character described, a cylinder having tapered perforations formed in its lower portion, a hopper carried by the upper portion of said cylinder, a crushing roller journaled to said cylinder, the said roller having a portion of its periphery cutaway, the said cutaway portion having longitudinally extending recesses formed therein, scraper bars resiliently mounted in said recesses, and means associated with said roller for rotating the same within the cylinder.

4. In a device of the character described, a cylinder having tapered perforations formed in its lower portion, a hopper carried by the upper portion of said cylinder, a crushing roller journaled to said cylinder, the said roller having a portion of its periphery cutaway, the said cutaway portion having longitudinally extending recesses formed therein, the said longitudinal recesses having spaced annular recesses formed in their lower walls, scraper bars, having spaced annular recesses, mounted in said longitudinal recesses, resilient means carried by the said annular recesses, and means associated with said roller for rotating the same within the cylinder.

In testimony whereof I affix my signature.

BÉLA BECKE.